(No Model.)
F. O. WORTHLEY.
MANGER.
No. 459,032. Patented Sept. 8, 1891.
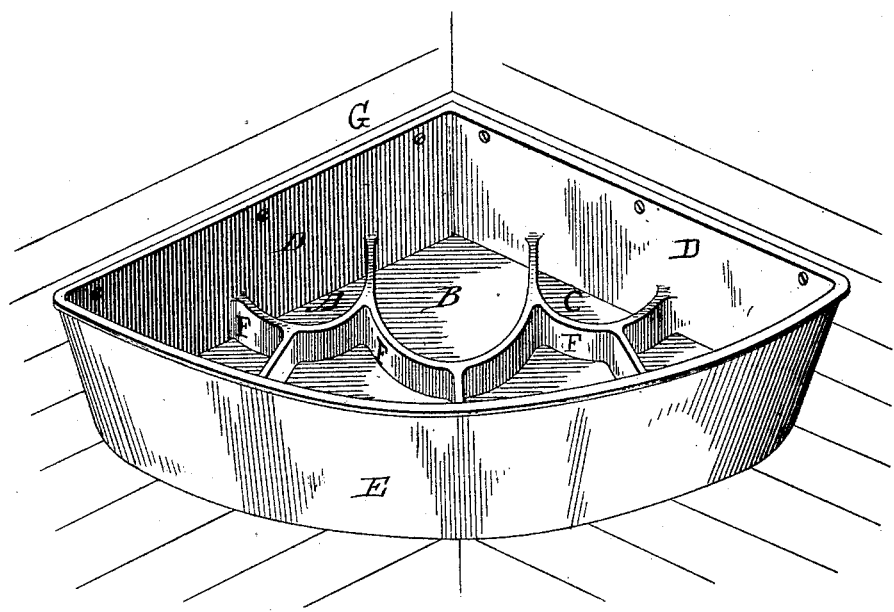
Witnesses.
H. E. Lodge
Chas A Tapper
Inventor.
Frank O Worthley.
THE NORRIS PETERS CO., PHOTO-LITHO., WASHINGTON, D. C.

UNITED STATES PATENT OFFICE.

FRANK O. WORTHLEY, OF BOSTON, MASSACHUSETTS.

MANGER.

SPECIFICATION forming part of Letters Patent No. 459,032, dated September 8, 1891.

Application filed March 16, 1891. Serial No. 385,280. (No model.)

*To all whom it may concern:*

Be it known that I, FRANK O. WORTHLEY, a citizen of the United States, residing at Boston, in the county of Suffolk and State of Massachusetts, have invented certain new and useful Improvements in Mangers; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

This invention relates to improvements in "mangers," so called, particularly to that class employed in stables.

The object of my invention is to provide an open manger which shall not only prevent the waste of grain, but prevent the animal from feeding too rapidly and pushing the nostrils into the grain.

The drawing accompanying this specification represents a front view in perspective plan of a manger embodying my invention.

In said drawing, I have represented a manger at G as a hollow receptacle or bowl formed by the main exterior walls D D E. Preferably this receptacle is in the shape of a quadrant in plan view, with the retaining-walls D D plane surfaces and disposed at right angles to each other in order to be readily adjusted and fastened in a corner of the stall. The front wall E is rounded and convex in order to afford greater capacity to the manger and present a surface less liable to injure the animal in case of contact therewith.

When a manger is made as a simple open receptacle, many animals have a practice not only of throwing out the feed and causing its waste, but from the facility with which the grain is reached they frequently eat too rapidly, with various attendant ailments. To prevent these difficulties, I propose to make a manger which shall prevent an animal either from wasting grain or from feeding to rapidly, but allow of easy breathing when eating. To attain these objects I cast or otherwise form a series of pockets or receptacles A B C in the bottom of the manger. These receptacles or cells are to be created by a branching upraised web or a series of continuously-connected divisional interior walls F F, which shall preferably so divide the manger that said pockets or cells shall have rounded corners and be of sufficient size to admit the lips of the animal, but prevent much lateral movement of the nose. Further, the depth of said cells shall be only a proportionate part of the entire depth of the manger, as shown. In this way the upper edges of the divisional walls prevent any quick movement of the nose, by which the grain is thrown out, while the small size of the pockets admit of but a limited quantity of feed in each. Hence the animal is compelled to feed slowly, first emptying one pocket and then passing to another, and so on until all are empty and the grain or feed is all consumed, but not in a rapid manner.

I do not desire to be limited to the precise form of the manger nor to the shape of the pockets or receptacles, since they may be varied somewhat in shape and depth and still embody my invention. Preferably, however, the corners of each receptacle shall be rounded or made in easy curves to enable the animal to reach all the food and prevent accumulations of the latter in said corners—a thing to be avoided.

What I claim is—

A feeding-manger provided with a series of continuously-connected division-walls extending entirely across the same in opposite directions, said division-walls having substantially-rounded corners and being of a height less than the outer walls of the manger, as set forth.

In testimony whereof I affix my signature in presence of two witnesses.

FRANK O. WORTHLEY.

Witnesses:
   H. E. LODGE,
   CHAS. A. TAPPER.